United States Patent Office 2,912,389
Patented Nov. 10, 1959

2,912,389

POLYMERS OF DIVINYLBENZENE DIOXIDE

Benjamin Phillips, Charleston, Charles W. McGary, Jr., South Charleston, and Charles T. Patrick, Jr., St. Albans, W. Va., assignors to Union Carbide Corporation, a corporation of New York No Drawing. Application August 8, 1957
Serial No. 676,912

35 Claims. (Cl. 260—2)

This invention relates to polyepoxide compositions. In one aspect, this invention relates to curable, polymerizable compositions comprising divinylbenzene dioxide and a polyfunctional amine, and to the partially cured and cured compositions resulting therefrom.

This application is a continuation-in-part of copending application Serial No. 676,913, entitled "Epoxide Compositions," by B. Phillips, C. W. McGary, Jr. and C. T. Patrick, Jr., filed August 8, 1957, and assigned to the same assignee as the instant application.

Epoxide resins have been made heretofore from mixtures of amines and polyglycidyl ethers of polyhydric phenols. These resins have achieved a degree of usefulness in the synthetic resins art but are limited by certain inherent characteristics to a restricted field of application. The viscosities of these mixtures are so high (of the order of 9,000 centipoises and higher at 25° C. without solvents or diluents) as to preclude easy handling and application. For example, in making castings from these mixtures extreme care and many times special equipment are required in order to obtain bubble-free castings. Although diluents can be used, there are the disadvantages of higher cost and lower strength properties of resins made from these mixtures. The use of solvents is undesirable because of bubble formation in the resin when the solvent is driven off during curing and the dangers brought about by solvent fumes. It is also difficult to successfully incorporate fillers and pigments in these mixtures. Mixtures of amines and polyglycidyl ethers of polyhydric phenols have been found heretofore to have extremely short pot-lives. In some cases curing at room temperature takes place before a homogeneous mixture of amine and polyglycidyl ether can be obtained. This is particularly disadvantageous in that the period of time permissible for working and applying the mixture is very short and in some cases negligible. Non-uniform resins are obtained in such cases because of the inability to form homogeneous amine-epoxide mixtures prior to curing. Such mixtures are additionally disadvantageous in that, even when their pot-lives are sufficiently long to permit the attainment of homogeneity, they cannot be maintained in workable form for long periods. This entails the necessity of maintaining the quantities of unmixed amine on hand which is accompanied by the dangers of the well-known toxicity and noxiousness associated with amines. The inconvenience of periodically preparing such amine-epoxide mixtures can be costly, time-consuming and dangerous.

The curable, polymerizable compositions of the instant invention comprise divinylbenzene dioxide and a polyfunctional amine in such proportions so as to provide from about 0.2 to 5.0 amino hydrogen atoms per epoxy group, and preferably from about 0.3 to 3.0 amino hydrogen atoms per epoxy group. By the term "polyfunctional amine," as used herein, is meant an amine having at least two active amino hydrogen atoms which can be on the same nitrogen or on different nitrogen atoms.

The polyfunctional amines contemplated include, among others, the aliphatic amines, aromatic amines, aralkyl amines, aliphatic polyamines, amino-substituted aliphatic alcohols, amino-substituted phenols, low molecular weight polyamides, addition products of polyamines and low molecular weight epoxides containing oxirane oxygen linked to vicinal carbon atoms and others.

Accordingly, one or more of the following objects will be achieved by the practice of this invention.

It is an object of this invention to prepare novel curable compositions comprising divinylbenzene dioxide and a polyfunctional amine, and to the partially cured and cured compositions resulting therefrom. It is another object of this invention to prepare novel curable compositions comprising divinylbenzene dioxide and a polyfunctional amine which are mobile liquids having viscosities as low as 15 centipoises at room temperature. It is a further object of this invention to prepare novel curable and partially curable compositions comprising divinylbenzene dioxide and a polyfunctional amine which when dissolved in a suitable organic solvent are useful in the field of coatings, adhesives, molding, potting of electrical components, and the like. A still further object of this invention is directed to a novel process of reducing the gelation period of a curable composition comprising divinyl-benzene dioxide and a polyfunctional amine. A yet further object of this invention is to prepare novel intermediate reaction products resulting from the partial reaction of a composition comprising divinylbenzene dioxedie and polyfunctional amine. Numerous other objects of the present invention will become apparent to those skilled in the art from a consideration of the instant specification.

Many of the curable compositions of this invention are mobile liquids possessing low viscosities as low as 15 centipoises at approximately 25° C. and are particularly capable of being easily prepared and conveniently applied to form bubble-free resins. The cured compositions of this invention have considerably higher heat distortion points than the commercial systems, for example, diglycidyl ethers of polyhydric phenols and polyamine systems. Many of the curable compositions of this invention comprising divinylbenzene dioxide and polyfunctional amines can be stored at room temperature, i.e., about 25° C., for periods up to two days, and longer, without substantial hardening or increase in viscosity. The curable compositions comprising, for example, divinylbenzene dioxide and a secondary aliphatic polyamine or aromatic polyamine, can be partially cured to form solid, partially polymerized resins which can be pulverized or ground to make molding to casting compounds. Such molding or casting compounds can be stored without refrigeration for long periods of time, e.g., up to six months and longer, and subsequently be molded or otherwise shaped and fully cured by the application of heat.

In addition, the partially cured resins can be dissolved in a suitable organic solvent such as xylene, methyl isobutyl ketone, butyl acetate, ethyl acetate, toluene, amyl acetate, and the like. The compositions dissolved in these exemplified solvents can be used as, for example, surface coating which can be subsequently heat cured to hard, tough, scratch-resistant coatings.

The proportion of partially cured resin to solvent will depend on various factors such as the particular mixture being cured, the degree or extent of the partial cure, the particular organic solvent employed and other considerations. In general, a solution comprising from about 10 to about 90 weight percent of partially cured resin, based on the total weight of partially cured resin and solvent, is suitable; from about 40 to 70 weight percent of partially cured resin, based on the total weight of partially cured resin and solvent, is preferred. Moreover, the uncured compositions can be dissolved in solvents of the type exemplified above and applied to surfaces and subsequently heat cured to form hard, tough coatings. Should the solution comprising the uncured composition or partially cured composition tend to "run" when applied to the surface, a conventional wetting agent and/or thixotropic agent can be added to the solution mixture to insure a more uniform coating on the surface.

The curing of the novel curable compositions of this invention can be facilitated, when desired, by incorporating therein small amounts of catalysts, hereinafter described, or by the application of heat without catalysts or by both measures. It has been observed that the pot life of the novel curable systems of this invention are better than the commercial epoxide-containing systems, e.g., diglycidyl ether of polyhydric phenols and polyamine systems.

The curable compositions of this invention can be readily prepared by mixing a polyfunctional amine, i.e., an amine having at least two active amino hydrogen atoms on the same or different nitrogen atoms, with divinylbenzene dioxide. It is preferred to agitate the curable composition, for example, by stirring or other suitable means, so as to obtain a homogeneous mixture or solution. When a solid or highly viscous amine is employed heating is advantageous in facilitating the formation of a solution. In any event, the application of heat should not be prolonged to the extent that appreciable curing takes place. Catalysts can be added at this point or at any other point prior to curing or not at all, as desired.

The curable compositions of this invention can be heated to a temperature in the range from about 15° C. to about 250° C., preferably from about 25° C. to about 200° C., for a period of time sufficient to produce hard, infusible resin products. Temperatures higher than 250° C. can be used although some discoloration which may not be desired may be brought about in the resins thus formed. The time for effecting the complete cure will be governed, to an extent, on several factors such as the particular polyamine component employed, the proportions of divinylbenzene dioxide and polyamine used, the temperature for effecting the cure, the use of a catalyst in the system, and other considerations. In general, the time for effecting the complete cure can be made to vary from several minutes to several days, e.g., ten days, depending upon the correlation of such factors as noted above.

A higher curing temperature generally will provide a resin in less time than a lower curing temperature. One preferable method is to heat the curable compositions to a temperature within the range from 25° C. to 150° C. to first partially cure the composition. A temperature from 100° C. to 200° C. then can be used to complete the cure. However, any one or combination of two or more temperatures within the specified range of 15° C. to 250° C. can be employed, if desired, to effect the full cure.

While not wishing to be held to any particular theory or mechanics of reaction, it is believed that in curing, one epoxy group of the diepoxide molecule reacts with a maximum of one amino hydrogen of the polyfunctional amine molecule with the formation of a hydroxyl group attached to the diepoxide molecule and a carbon to nitrogen to carbon linkage interconnecting the amine and diepoxide molecules. Thus, according to this belief, a polyfunctional amine having more than 2 amino hydrogens to the molecule would cross-link through carbon to nitrogen to carbon linkages. Also, according to our observations a degree of etherification occurs from intermolecular reactions of two or more epoxy groups with each other and from intermolecular reactions of an epoxy group with a hydroxyl group formed in the above-noted manner by a previous reaction of an epoxy group with an amino hydrogen. Thus, additional cross-linking through carbon to oxygen to carbon linkages is thought to be effected by these intermolecular reactions between epoxy groups or epoxy groups and hydroxyl groups.

The resins of this invention can be characterized as having interconnected units represented by the following formula:

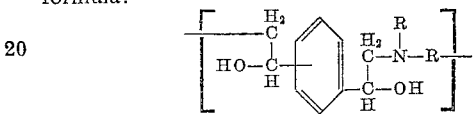

wherein each R, individually, can be hydrogen, alkyl, aryl, and the like. The variables R can be expressed as being "polyfunctional amine residue." By the term "polyfunctional amine residue," as used herein, is meant a polyvalent group which can be regarded as the residue of a polyfunctional amine molecule to which two or more active amino hydrogen atoms on the same nitrogen or different nitrogen atoms are attached to constitute said polyfunctional amine molecule. Thus, a primary aliphatic amine consists of the divalent group or the polyfunctional amine residue to which two active amino hydrogen atoms are attached. In like manner, for example, ethylenediamine consists of the tetravalent group or the polyfunctional amine residue to which four active amino hydrogen atoms are attached.

Solid resins have been obtained by curing the curable compositions of this invention which contain such relative proportions of polyfunctional amine and divinylbenzene dioxide as provide from about 0.2 to 5.0 amino hydrogen atoms of the amine for each epoxy group from the diepoxide. Hard, tough, infusible resins have been obtained from the curable compositions containing such relative amounts of polyfunctional amine and divinylbenzene dioxide as provided from about 0.3 to 3.0 amino hydrogen atoms of the amine for each epoxy group of the diepoxide. Resins produced from the curable compositions containing from about 1.0 to 3.0 amino hydrogen atoms per epoxy group have potential use as anion exchange resins. Resins produced from the curable compositions containing from about 3.0 to 5.0 amino hydrogen atoms per epoxy group are useful as hardenable polyamines which can be further reacted with polyepoxides, e.g., divinylbenzene dioxide or diglycidyl ether of 2,2-bis(4-hydroxyphenyl)propane, to produce useful resin products. Cured compositions containing less than 0.2 amino hydrogen atom per epoxy group are liquid in nature and apparently cannot be cured per se to produce hard, tough solids. However, hardenable epoxide resins can be obtained from the curable compositions, for example, which contain less than 0.2 amino hydrogen atom per epoxy groups. Such hardenable resins can be polymerized with active hydrogen compounds, e.g., polyamines, polyhydric phenols, polycarboxylic acids and the like, or polycarboxylic acid anhydrides, to form useful products or they can be used as plasticizers and/or stabilizers for chlorine-containing resins. The curable compositions of this invention containing more than 5.0 amino hydrogen atoms per epoxy group are unsatisfactory since the resins obtained therefrom are viscous liquids, or tacky and/or fusible in composition. Curable compositions comprising divinylbenzene dioxide and an amine having but one active amino hydrogen per amine molecule generally do not form solid resins on curing, but rather, liquids of varying viscosities are produced. Resins having different physical properties can be produced by curing the compositions of this invention which contain from about 0.2 to 5.0 amino hydrogens to epoxy groups.

The diepoxide, i.e., divinylbenzene dioxide, can be characterized by the following formula:

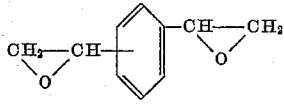

and can be prepared by treatment of divinylbenzene with an excess of peracetic acid solution in an inert solvent such as acetone or ethyl acetate at approximately 70° C., followed by isolation of the diepoxide product by fractional distillation. The dioxide can also be prepared by treating divinylbenzene monoxide with peracetic acid under approximately the same conditions. Other modes of preparing divinylbenzene dioxide are more fully discussed in the literature. Any of the three isomeric forms of divinylbenzene dioxide, i.e., ortho-, meta-, or para-divinylbenzene dioxide, or mixtures thereof, can be employed as starting material in the preparation of the novel compositions of this invention.

Various polyfunctional amines containing at least two active amino hydrogen atoms are useful in preparing the curable, partial cured, and cured compositions of this invention. Among the polyfunctional amines contemplated providing that said amines contain at least two active amino hydrogen atoms which can be on the same nitrogen atoms of different nitrogen atoms, include the aliphatic amines, aromatic amines, aralkyl amines, cycloaliphatic amines, alkaryl amines, aliphatic polyamines including polyalkylene polyamines, amino-substituted aliphatic alcohols and phenols, polyamides, addition products of polyamines and low molecular weight epoxides containing oxirane oxygen linked to vicinal carbon atoms, and others.

Typical aliphatic amines include methylamine, ethylamine, propylamine, isopropylamine, butylamine, isobutylamine, 2-ethylhexylamine, 3-propylheptylamine, and the like.

Examples of aromatic amines, aralkyl amines and alkaryl amines include, among others, aniline, o-hydroxyaniline, m-toluidine, 2,3-xylidine, mesidine, benzylamine, phenethylamine, 1-naphthylamine, meta-, ortho-, and para-phenylenediamines, 1,4-naphthalenediamine, 3,4-toluenediamine and the like.

Illustrative cycloaliphatic amines include cyclopentylamine, cyclohexylamine, p-menthane-1,8-diamine and others.

Among the polyamides, i.e., those having an average molecular weight range from about 300 to about 10,000, include condensation products of polycarboxylic acids, in particular, hydrocarbon dicarboxylic acids, such as malonic acid, succinic acid, glutaric acid, adipic acid, dilinoleic acid, and the like, with polyamines, particularly diamines, such as ethylenediamine, propylenediamine, butylenediamine and the like.

The aliphatic polyamines contemplated in the present invention include ethylenediamine, propylenediamine, butylenediamine, pentylenediamine, hexylenediamine, octylenediamine, nonylenediamine, decylenediamine, and the like. Polyalkylene polyamines such as diethylenetriamine, triethylenetetramine, tetraethylenepentamine, dipropylenetriamine, and the like are particularly suitable.

The amino-substituted aliphatic alcohols and phenols suitable for use in the present invention are illustrated by 2-aminoethanol, 2-aminopropanol, 3-aminobutanol, 1,3-diamino-2-propanol, 2-aminophenol, 4-aminophenol, 2,3-diaminoxylenol, and the like.

Other illustrations of polyfunctional amines are the addition products of polyamines, in particular, diamines and triamines and epoxides containing oxirane oxygen linked to vicinal carbon atoms, such as ethylene oxide, propylene oxide, butadiene dioxide, diglycidyl ether, epoxidized soybean oil, epoxidized sofflower oil, and polyglycidyl ethers, such as those prepared from polyhydric phenols and epichlorohydrin. Particularly useful polyfunctional amines are the mono-hydroxyalkyl polyalkylene polyamines which can be prepared by the addition reaction of polyalkylene polyamines preferably, ethylenediamine, propylenediamine, diethylenetriamine, dipropylenetriamine, triethylenetetramine, and the like, with ethylene oxide or propylene oxide. This reaction can be conducted under pressure at temperatures of 50° C. or 55° C. to boiling in the absence of solvents or in the presence of water or an alcohol. However, the reaction is more advantageously carried out at temperatures below 40° C. and preferably below 35° C. without pressure. The amines so produced include the mono-hydroxyalkyl-substituted alkylene polyamines such as N-hydroxyethylethlenediamine, N-hydroxypropyldiethylenetriamine, N-hydroxyethylpropylenediamine, N-hydroxyethyldipropylenetriamine, and the like. Other polyfunctional amines can be prepared from known procedures by the addition reaction of polyglycidyl polyethers of dihydric phenols and polyamines, in particular, polyalkylene polyamines. Of particular importance in forming these epoxide polyamine adducts are the diglycidyl diethers of dihydric phenols such as for example, the homologues of dihydroxydiphenylmethanes singly or mixed and the dihydroxydiphenyldimethylmethanes singly or mixed. Mixtures of diglycidyl diethers of dihydric phenols can be prepared by reacting epichlorohydrin with a dihydric phenol using a molar excess of epichlorohydrin over the theoretical molar requirement. Substantially pure cuts of the diglycidyl diethers then can be obtained by fractional distillation under reduced pressure, for example. Illustratively, the polyfunctional amine, i.e., the epoxide polyamine adduct, itself can be prepared by mixing the diglycidyl polyether of a dihydric phenol with a polyalkylene diamine such as diethylenetriamine, dipropylenetriamine, and the like, bringing to an elevated temperature for example, up to about 200° C. and maintaining at such an elevated temperature for a period of from 4 to 5 hours. Alternatively, as an illustration, polyfunctional amines can be prepared by adding a diglycidyl diether of a dihydric phenol to a polyalkylene polyamine over a perior of time, e.g., from about three to four hours, while maintaining the reaction mixture at an elevated temperature, for example up to about 200° C. and subsequently adding a dihydric phenol.

Examples of still other polyfunctional amines suitably adaptable for use in the present invention include, among others, heterocyclic nitrogen compounds such as piperazine, 2,5-dimethylpiperazine, and the like; aminoalkyl-substituted heterocyclic compound such as N-(aminopropyl)morpholine, N-(aminoethyl)morpholine, and the like; amino-substituted heterocyclic nitrogen compounds such as melamine, 2,4-diamino-6-(aminoethyl)pyrimidine, and the like; dimethylurea, guanidine, p,p'-sulfonyldiamine, 3,9-bis(aminoethyl)-spirobimethadioxane, hexahydrobenzamide, and others.

Other polyfunctional amines having a total of at least two active amino hydrogen atoms to the molecule can be advantageously employed in the epoxide compositions of this invention. For example, such polyfunctional amines as mixtures of p,p'-methylenedianiline and m-phenylenediamine, or other mixtures of two or more polyfunctional amines can be used.

Polyfunctional amines formed by the addition of amines to unsaturated compounds such as acrylonitrile, ethyl acrylate, propyl acrylate, butyl crotonate, and the like are also suitable.

Catalysts which can be employed in our curable compositions to increase the curing rate and/or reduce the gelation period are the metal halide Lewis acids, e.g., boron trifluoride, stannic chloride, zinc chloride, aluminum chloride, ferric chloride, piperidine-boron trifluoride complex, boron trifluoride-1,6-hexanediamine complex, monoethylamine-boron trifluoride complex, boron trifluoride-dimethyl ether complex, boron trifluoride-diethyl ether complex, and the like; polyols, i.e., saturated aliphatic and cycloaliphatic alcohols, and the phenols, e.g., propanol, decanol, cyclopentanol, cyclohexanol, ethylene glycol, diethylene glycol, dipropylene glycol, phenol, resorcinol, catechol, pyrogallol, naphthol, and the like; alkali metal hydroxides, e.g., sodium hydroxide, potassium hydroxide, and the like. Uniform dispersions of catalyst in the curable compositions prior to curing have been found to be desirable in order to minimize local curing around catalyst particles. Agitation of the curable compositions as the catalyst is sufficient when the catalyst is miscible with the compositions. When the two are immiscible, the catalyst can be added in an organic solvent. Typical solvents for the catalysts include organic ethers, e.g., diethyl ether, dipropyl ether; organic esters, e.g., methyl acetate, ethyl propionate; organic ketones, e.g., acetone, cyclohexanone, and the like. The catalyst is employed in catalytic quantities, and, in general, catalyst concentrations up to 15.0 weight percent, and higher, based on the weight of the diepoxide, have been found to be advantageous. Catalyst concentrations as low as 0.002 weight percent based on the weight of diepoxide have been found to provide appreciable catalytic effect. Catalyst concentration in the range from about 0.1 to about 10.0 weight percent, based on the weight of the diepoxide, is preferred.

It is evident from a consideration of the present invention that the novel curable, partially cured and cured compositions have a variety of useful and unexpected properties and uses. Specifically, the curable compositions comprising divinylbenzene dioxide and polyfunctional amine in proportions of diepoxide and amine which provide from about 0.2 to 5.0 amino hydrogen atoms per epoxy group, can be cured to produce resins ranging from soft and flexible to rigid, tough and infusible products. The curable compositions comprising divinylbenzene dioxide and polyfunctional amine in proportions of diepoxide and amine which provide from about 0.3 to 3.0 amino hydrogen atoms per epoxy group can be cured to produce tough, infusible products. These solid resins are useful in producing a large variety of molded or cast articles of manufacture depending upon the proportions of amino hydrogen atoms per epoxy group employed in the above broad range. For example, the curable compositions can be cast or molded in many different sizes and shapes to form such articles as buttons, combs, brush handles, children's toys, structural parts for instrument and radio cabinets and the like. By partially curing solid resin-producing compositions to form a gel, a heat hardenable composition can be obtained. This heat hardenable composition then can be granulated or reduced to powder form and used as a molding or casting composition with or without the addition of other ingredients. Fillers, e.g., talc, wood flour, alpha cellulose, and the like, and pigments, e.g., titanium dioxide, antimony oxide, zinc oxide, carbon black, and the like, can be incorporated with our compositions to produce colored opaque objects.

The solid resins having high heat distortion values are useful in industrial applications wherein load carrying capabilities at high temperatures in addition to hardness and toughness are required. Such applications include hot fluid carrying conduits, high temperature electrical insulation, e.g., in high speed aircraft and guided missiles, tools, dies and molds used at high temperatures, and various laminates, molded articles, adhesives and surface coatings which are subject to high temperature uses.

The solid resins are also useful as coatings and the like for providing durable surfaces to objects. Of particular importance in this regard is the fluid nature of the curable compositions making them particularly well suited for easy application to surfaces by such conventional methods as brushing, spraying, spreading and the like. This application can be performed without a solvent although solvents of the type discussed previously can be employed. Pigments can also be added to provide coloration to the coating or the composition can be applied without a pigment to give a coating of natural color or transparency.

A further use of the curable compositions is in the field of adhesives. These compositions, when cured, adhere tenaciously to many types of materials, e.g., wood, cloth, metal, glass, paper and the like. In this respect they are particularly useful in manufacturing laminates of the above materials.

In the following illustrative examples, Barcol hardness values were determined by the use of Barcol Impressor GYZJ-934-1 at a temperature at 25° C.; heat distortion point values of the resins were ascertained in accordance with ASTM method D-648-45 T using 264 p.s.i. fiber stress. The divinylbenzene dioxide employed ranged in purity from 60.0 to 84.2 weight percent with the impurity substantially being ethylstyrene oxide. The proportions indicated in each example were calculated on the basis of the purity of the diepoxide as determined by the pyridine hydrochloride method of analysis. Unless otherwise indicated the examination or description of the resins were conducted at room temperature, i.e., 25° C.

EXAMPLE 1

A mixture was prepared from 0.74 gram of divinylbenzene dioxide (65 weight percent purity) and 0.26 gram of an addition product of 4 mols of diethylenetriamine with 1 mol of diglycidyl ether of 2,2-bis(4-hydroxyphenyl)-propane. This mixture was allowed to gel at room temperature i.e., 25° C. A gel time of 4.2 hours was observed. After post curing for one hour at 160° C., a transparent, yellow colored, tough resin was obtained which had a Barcol hardness of 36.

EXAMPLE 2

Divinylbenzene dioxide (0.81 gram) of (65 weight percent purity) and 1,6-hexanediamine (0.28 gram) were mixed in the proportion of 1.0 amino hydrogen per epoxy group. This mixture was gelled in 3 minutes at 120° C. After post curing for 6 hours at 160° C., a clear, yellow colored, hard, tough resin was obtained.

EXAMPLE 3

A mixture was prepared from 0.27 gram of p-phenylenediamine and 0.81 gram of divinylbenzene dioxide (65 weight percent purity). This mixture contained proportions of amine and diepoxide providing one active amino hydrogen atom per epoxy group. Gelation occurred in 3 minutes at 120° C. After curing for 6 hours at 160° C., a hard, tough, amber colored resin was obtained.

EXAMPLE 4

A mixture was prepared from 2.7 grams of divinylbenzene dioxide (60 weight percent purity) and 1.0 gram of p,p'-methylenedianiline. This mixture provided one amino hydrogen per epoxy group. This mixture was heated to a temperature below about 120° C. until homogeneous, and subsequently maintained for 2 hours at 120° C. plus 6 hours at 160° C. A gel was observed after 29 minutes at 120° C. An amber colored, tough resin having a Barcol hardness of 54 was obtained.

EXAMPLE 5

A mixture was prepared from 2.91 grams of divinylbenzene dioxide of 84.2 weight percent purity and 1.5 grams of an addition product of 4 mols of diethylenetriamine with 1.0 mol of diglycidyl ether of 2,2-bis(4-hydroxyphenyl)propane. This mixture contained proportions of addition product and diepoxide providing one amino hydrogen per epoxy group. This mixture gelled in 4 hours at 26° C. The mixture was maintained at 26° C. for 4.5 hours; at 120° C. for 0.25 hour; and at 160° C. for 6 hours. There was obtained an amber colored resin having a Barcol hardness of 60 at 26° C. At 120° C., this resin had a Barcol hardness of 20.

EXAMPLE 6

A mixture was prepared from 0.97 gram of divinylbenzene dioxide of 84.2 weight percent purity and 0.22 gram of diethylenetriamine. This mixture provided one amino hydrogen per epoxy group. The resulting mixture gelled at 26° C. after 5–20 hours. The temperature was maintained at 26° C. for 7 days; a pale yellow colored, tough resin having a Barcol hardness of 9 was obtained.

EXAMPLE 7

A mixture was prepared from 0.97 gram of divinylbenzene dioxide of 84.2 weight percent purity and 0.97 gram of p,p'-methylenedianiline so as to provide one amino hydrogen per epoxy group. Gelation occurred when the resulting mixture was heated for 26 minutes at 120° C. A post cure at 160° C. for 1 hour was effected. An amber colored, tough resin having a Barcol hardness of 55 at 26° C. was obtained. At 160° C., this resin had a Barcol hardness of 15.

EXAMPLES 8–10

Three mixtures of varying proportions of divinylbenzene dioxide and the addition product of 4 mols of diethylenetriamine with 1 mol of 2,2-bis(4-hydroxyphenyl)propane were prepared. These mixtures contained proportions of addition product and diepoxide providing one amino hydrogen atom per epoxy group. These mixtures gelled at 26° C. after 4.2 hours. Post cures were effected at different temperatures for varying periods of time as indicated in Table I below. The results are set out in the following Table I:

Table I

| Example Number | Divinylbenzene Dioxide (grams) | Addition Product (grams) | Cure (Hours and ° C.) | Heat Distortion Point, ° C. | Barcol Hardness |
|---|---|---|---|---|---|
| 8 | [1] 20.0 | 9.1 | 4.2 hrs. @ 26°<br>1 hr. @ 80°<br>2 hrs. @ 120°<br>6 hrs. @ 160° | 101 | 58 |
| 9 | [2] 20.0 | 10.2 | 9 days @ 26° | 59 | 49 |
| 10 | [2] 26.0 | 10.2 | 9 days @ 26°<br>4 hrs. @ 120°<br>6 hrs. @ 160° | 126 | ([3]) |

[1] 74 weight percent purity, based on weight of diepoxide.
[2] 83 weight percent purity, based on weight of diepoxide.
[3] Flexural strength of 13,000 p.s.i.; ASTM D-790–49T.

EXAMPLE 11

A mixture was prepared from 20.0 grams of divinylbenzene dioxide of 74 weight percent purity and 9.1 grams of p,p'-methylenediamine so as to provide one amino hydrogen per epoxy group. The resulting mixture gelled at 50° C. after 6–14 hours. The temperature was maintained at 50° C. for 14 hours; at 120° C. for 7.5 hours; and at 160° C. for 6 hours. A tough resin having a Barcol hardness of 58 was obtained.

EXAMPLES 12–17

Six mixtures, each containing 1.1 grams of divinylbenzene dioxide of 74 weight percent purity and 0.5 gram of p,p'-methylenedianiline, were prepared. Various catalysts were subsequently added to five of the above mixtures. These mixtures were then heated to 80° C. and the times required to produce gelation were recorded. The results are set out in Table II below:

Table II

| Example Number | Catalyst | Grams | Percent[1] (By Weight) | Gel Times at 120° C. (Minutes) |
|---|---|---|---|---|
| 12 | None | | | 107 |
| 13 | Bisphenol A [2] | 0.2 | 18.2 | 9 |
| 14 | Ethylene Glycol | 0.1 | 9.1 | 36 |
| 15 | ([3]) | 0.1 | 9.1 | 93 |
| 16 | Potassium Hydroxide [4] | 0.004 | 0.36 | 76 |
| 17 | Boron trifluoride monoethylamine complex | 0.1 | 9.1 | <2 |

[1] Percent by weight based on the weight of the diepoxide.
[2] 2,2-bis(4-hydroxyphenyl) propane.
[3] Allyl 2,4,6-trimethylolphenyl ether.
[4] One drop of a 20 weight percent solution in ethylene glycol.

EXAMPLES 18–23

Six mixtures, each containing 1.1 grams of divinylbenzene dioxide admixed with different polyfunctional amines, where prepared. Mixtures prepared from divinylbenzene dioxide of 60 weight percent purity and polyfunctional amine provided one amino hydrogen per 0.8 epoxy group; those prepared from divinylbenzene dioxide of 74 weight percent purity and polyfunctional amine provided one amino hydrogen per epoxy group. The results are set out in Table III below:

Table III

| Example Number | Divinylbenzene Dioxide Purity [1] | Amine | Grams | Gel Time and Temperature (Hrs. and °C.) | Cure (Hrs. and °C.) | Resin Description |
|---|---|---|---|---|---|---|
| 18 | 60 | ethylene diamine | 0.15 | 7–20 hrs. @ 26° | 24 hrs. @ 26°<br>6 hrs. @ 120°<br>6 hrs. @ 160° | amber, tough, Barcol, 35. |
| 19 | 74 | do | 0.15 | 7–20 hrs. @ 26° | 24 hrs. @ 26°<br>6 hrs. @ 120°<br>6 hrs. @ 160° | amber, tough, Barcol, 56. |
| 20 | 74 | 1,6-hexane diamine | 0.29 | 7–20 hrs. @ 26° | 24 hrs. @ 26°<br>6 hrs. @ 120°<br>6 hrs. @ 160° | amber, tough, Barcol, 40. |
| 21 | 60 | xylylene diamine | 0.34 | 7–20 hrs. @ 26° | 24 hrs. @ 26°<br>6 hrs. @ 120°<br>6 hrs. @ 160° | amber, tough, Barcol, 40. |
| 22 | 74 | do | 0.34 | 7–20 hrs. @ 26° | 24 hrs. @ 26°<br>6 hrs. @ 120°<br>6 hrs. @ 160° | amber, tough, Barcol, 51. |
| 23 | 74 | aniline | 0.47 | 13–20 hrs. @ 120° | 28 hrs. @ 120°<br>6 hrs. @ 160° | amber, hard. |

[1] Weight percent.

EXAMPLES 24–35

Twelve mixtures, each containing 0.97 gram of divinylbenzene dioxide of 83.1 weight percent purity admixed with various proportions of diethylenetriamine, were prepared as indicated in Table IV below. The times and temperatures for gelation to occur, are set out in said table. Examination of the resins was conducted at room temperature. The results are as follows:

*Table IV*

| Example Number | DETA [1] (grams) | Ratio [2] | Gel Time and Temperature | Cure, Hours, °C. | Resin Description |
|---|---|---|---|---|---|
| 24 | 0.022 | 0.1 | No gel | 24 hrs. @ 26°<br>3 hrs. @ 100°<br>45 hrs. @ 120°<br>6 hrs. @ 160° | Amber, viscous liquid. |
| 25 | 0.043 | 0.2 | 30–40 hrs. at 120° C | 24 hrs. @ 26°<br>3 hrs. @ 100°<br>45 hrs. @ 120°<br>6 hrs. @ 160° | Amber, hard, tough. |
| 26 | 0.065 | 0.3 | 5–30 hrs. at 120° C | 24 hrs. @ 26°<br>3 hrs. @ 100°<br>45 hrs. @ 120°<br>6 hrs. @ 160° | Amber, tough, Barcol, 46. |
| 27 | 0.086 | 0.4 | <5 hrs. at 120° C | 24 hrs. @ 26°<br>3 hrs. @ 100°<br>5 hrs. @ 120°<br>6 hrs. @ 160° | Yellow, tough, Barcol, 50. |
| 28 | 0.129 | 0.6 | 6 hrs. at 26° C | 24 hrs. @ 26°<br>3 hrs. @ 100°<br>5 hrs. @ 120°<br>6 hrs. @ 160° | Yellow, tough, Barcol, 49. |
| 29 | 0.215 | 1.0 | 6 hrs. at 26° C | 24 hrs. @ 26°<br>3 hrs. @ 100°<br>5 hrs. @ 120°<br>6 hrs. @ 160° | Yellow, tough, Barcol, 45. |
| 30 | 0.430 | 2.0 | <1.5 hrs. at 26° C | 24 hrs. @ 26°<br>3 hrs. @ 100°<br>5 hrs. @ 120°<br>6 hrs. @ 160° | Yellow, tough, Barcol, 35. |
| 31 | 0.645 | 3.0 | >1.5 hrs. at 26° C | 24 hrs. @ 26°<br>3 hrs. @ 100°<br>5 hrs. @ 120°<br>6 hrs. @ 160° | Yellow, tough, Barcol, 0. |
| 32 | 0.752 | 3.5 | ([3]) | 24 hrs. @ 26°<br>3 hrs. @ 100°<br>45 hrs. @ 120°<br>6 hrs. @ 160° | Amber, soft, firm. |
| 33 | 0.860 | 4.0 | ([3]) | 24 hrs. @ 26°<br>3 hrs. @ 100°<br>45 hrs. @ 120°<br>6 hrs. @ 160° | Amber, firm, soft. |
| 34 | 0.966 | 4.5 | ([3]) | 24 hrs. @ 26°<br>3 hrs. @ 100°<br>45 hrs. @ 120°<br>6 hrs. @ 160° | Do. |
| 35 | 1.08 | 5.0 | No gel | 24 hrs. @ 26°<br>3 hrs. @ 100°<br>45 hrs. @ 120°<br>6 hrs. @ 160° | Do. |

[1] Diethylenetriamine.
[2] Equivalents of amino hydrogen groups per epoxy group.
[3] Were gelled after 24 hours at 26° C., but melted at 100° C. without reforming a gel.

EXAMPLE 36

A mixture was prepared from 1.1 grams of divinylbenzene dioxide (74 weight percent purity) and 1.3 grams of diethylenetriamine. This mixture provided 6.0 amino hydrogen atoms per epoxy group. The resulting mixture was allowed to stand at room temperature, i.e., approximately 25° C., for one hour and then was heated to 20° C. and maintained thereat for 22–23 hours during which time gelation did not occur. The temperature subsequently was raised to 160° C. for an additional six hour period. Upon cooling to room temperature, a dark amber highly viscous liquid was obtained.

EXAMPLE 37

A mixture was prepared from 1.1 grams of divinylbenzene dioxide (74 weight percent purity) and 0.05 gram of p,p'-methylenedianiline. This mixture provided 0.1 amino hydrogen atom per epoxy group. The resulting mixture was allowed to stand at room temperature, i.e., approximately 25° C., for one hour and then was heated to 120° C. and maintained thereat for 22–23 hours during which time gelation did not occur. The temperature subsequently was raised to 160° C. for an additional six-hour period. Upon cooling to room temperature, a pale amber, viscous liquid was obtained.

EXAMPLE 38

A mixture was prepared from 1.1 grams of divinylbenzene dioxide (74 weight percent purity) and 1.75 grams of 1,6-hexanediamine. This mixture provided 6.0 amino hydrogen atoms per epoxy group. The resulting mixture was allowed to stand at room temperature, i.e., approximately 25° C., for one hour and then was heated to 120° C. and maintained thereat for 22–23 hours during which time gelation did not occur. The mixture was subsequently raised to 160° C. for an additional six-hour period. Upon cooling to room temperature, a yellow, soft, tacky product was obtained.

EXAMPLE 39

A mixture was prepared from 1.1 grams of divinylbenzene dioxide (74 weight percent purity) and 2.0 grams of xylylene diamine. This mixture provided 6.0 amino hydrogen atoms per epoxy group. The resulting mixture was allowed to stand at room temperature, i.e., approximately 25° C., for one hour and then was heated to 120° C. and maintained thereat for 22–23 hours during which time gelation did not occur. The temperature was subsequently raised to 160° C. for an additional six-hour period. Upon cooling to room temperature, an amber, viscous liquid was obtained.

EXAMPLE 40

A mixture was prepared from 1.1 grams of divinylbenzene dioxide (74 weight percent purity) and 1.29 grams of dibutylamine. This mixture provided 1.0 amino hydrogen atom per epoxy group. The resulting mixture was allowed to stand at room temperature, i.e., approximately 25° C., for one hour and then was heated to 120° C. and maintained thereat for 22–23 hours during which time gelation did not occur. The temperature subsequently was raised to 160° C. for an additional six-hour period. Upon cooling to room temperature, an amber, viscous liquid was obtained.

EXAMPLE 41

A mixture was prepared from 1.1 grams of divinylbenzene dioxide (74 weight percent purity) and 2.4 grams of di(2-ethylhexyl)amine. This mixture provided 1.0 amino hydrogen atom per epoxy group. The resulting mixture was allowed to stand at room temperature, i.e., approximately 25° C., for one hour and then was heated to 120° C. and maintained thereat for 22–23 hours during which time gelation did not occur. The temperature subsequently was raised to 160° C. for an additional six-hour period. Upon cooling to room temperature, an amber, viscous liquid was obtained.

EXAMPLE 42

A mixture was prepared from 1.1 grams of divinylbenzene dioxide (74 weight percent purity) and 0.22 gram of diethylenetriamine. This mixture provided 1.0 amino hydrogen atom per epoxy group. The resulting mixture was allowed to stand at room temperature, i.e., approximately 25° C., for 130 minutes after which period of time a yellow, viscous liquid was obtained. This resulting viscous liquid was dissolved in 5.0 grams of methyl isobutyl ketone and an iron panel or strip was dipped into the resulting solution. The iron panel was removed almost immediately from this solution, allowed to air dry for 15 minutes, followed by baking said panel at 160° C. for 30 minutes. A thin coating was observed on that portion of the iron panel which was dipped into the methyl isobutyl ketone-containing solution. The resulting coating on the panel was glossy, colorless, tough, and resistant to cracking on continual bending (over 90 degree bends) of the iron panel. The coating displayed excellent adhesion and excellent acetone resistance. Efforts to scratch the coating, by hand, with a 9H Double Eagle pencil were futile.

Reasonable variations and modifications of this invention can be made or carried out in the light of the above disclosure without departing from the spirit and scope thereof.

What is claimed is:

1. A curable composition comprising divinylbenzene dioxide and a polyfunctional amine, said composition containing from about 0.2 to 5.0 amino hydrogen atoms of said polyfunctional amine for each epoxy group of said divinylbenzene dioxide.

2. Thermosetting intermediate reaction products obtained by the partial reaction of the composition of claim 1 under the influence of heat.

3. The polymerized, cured product obtained by heating the composition of claim 1.

4. A curable composition comprising divinylbenzene dioxide and a polyfunctional aliphatic amine, said composition containing from about 0.2 to 5.0 amino hydrogen atoms of said aliphatic amine for each epoxy group of said divinylbenzene dioxide.

5. The polymerized, cured product obtained by heating the composition of claim 4.

6. A curable composition comprising divinylbenzene dioxide and a polyfunctional aromatic amine, said composition containing from about 0.2 to 5.0 amino hydrogen atoms of said aromatic amine for each epoxy group of said divinylbenzene dioxide.

7. The polymerized, cured product obtained by heating the composition of claim 6.

8. A curable composition comprising divinylbenzene dioxide and a polyfunctional cycloaliphatic amine, said composition containing from about 0.2 to 5.0 amino hydrogen atoms of said cycloaliphatic amine for each epoxy group of said divinylbenzene dioxide.

9. The polymerized, cured product obtained by heating the composition of claim 8.

10. A curable composition comprising divinylbenzene dioxide and a polyfunctional polyamide prepared by the condensation of a polycarboxylic acid with a polyamine, said polyamide having a molecular weight in the range of from about 300 to about 10,000, said composition containing from about 0.2 to 5.0 amino hydrogen atoms of said polyamide for each epoxy group of said divinylbenzene dioxide.

11. The polymerized, cured product obtained by heating the composition of claim 10.

12. A curable composition comprising divinylbenzene dioxide and a polyfunctional aliphatic polyamine compound, said composition containing from about 0.2 to 5.0 amino hydrogen atoms of said aliphatic polyamine compound for each epoxy group of said divinylbenzene dioxide.

13. The polymerized, cured product obtained by heating the composition of claim 12.

14. A curable composition comprising divinylbenzene dioxide and a polyfunctional polyalkylene polyamine, said composition containing from about 0.2 to 5.0 amino hydrogen atoms of said polyalkylene polyamine for each epoxy group of said divinylbenzene dioxide.

15. The polymerized, cured product obtained by heating the composition of claim 14.

16. A curable composition comprising divinylbenzene dioxide and a polyfunctional amino-substituted aliphatic alcohol, said composition containing from about 0.2 to 5.0 amino hydrogen atoms of said amino-substituted aliphatic alcohol for each epoxy group of said divinylbenzene dioxide.

17. The polymerized, cured product obtained by heating the composition of claim 16.

18. A curable composition comprising divinylbenzene dioxide and an addition product of a polyfunctional polyalkylene polyamine with an epoxide containing oxirane oxygen linked to vicinal carbon atoms, said composition containing from about 0.2 to 5.0 amino hydrogen atoms of said addition product for each epoxy group of said divinylbenzene dioxide.

19. The polymerized, cured product obtained by heating the composition of claim 18.

20. A curable composition comprising divinylbenzene dioxide and a mixture of at least two polyfunctional amines, said composition containing from about 0.2 to 5.0 amino hydrogen atoms of said polyfunctional amine mixture for each epoxy group of said divinylbenzene dioxide.

21. The polymerized, cured product obtained by heating the composition of claim 20.

22. A curable composition comprising divinylbenzene dioxide and a monohydroxyalkyl-substituted alkylene polyamine, said composition containing from about 0.2 to 5.0 amino hydrogen atoms of said alkylene polyamine for each epoxy group of said divinylbenzene dioxide.

23. The polymerized, cured product obtained by heating the composition of claim 22.

24. Thermosetting intermediate reaction products resulting from the partial reaction of a composition comprising divinylbenzene dioxide and a polyfunctional amine, said composition containing from about 0.2 to 5.0 amino hydrogen atoms of said polyfunctional amine for each epoxy group of said divinylbenzene dioxide, said intermediate reaction products being dissolved in an organic solvent, the resulting solution comprising from about 10 to about 90 weight percent of said intermediate reaction products, based on the total weight of said intermediate reaction products and solvent.

25. A curable composition comprising divinylbenzene dioxide, a polyfunctional amine, and a catalytic quantity of a compound selected from the group consisting of metal halide Lewis acids, polyols, and alkali metal hydroxides.

26. A curable composition comprising divinylbenzene dioxide and diethylenetriamine in an amount so as to provide from about 0.2 to 5.0 amino hydrogen atoms of said diethylenetriamine for each epoxy group of said divinylbenzene dioxide.

27. The polymerized, cured product obtained by heating the composition of claim 26.

28. A curable composition comprising divinylbenzene dioxide and xylenediamine in an amount so as to provide from about 0.2 to 5.0 amino hydrogen atoms of said xylenediamine for each epoxy group of said divinylbenzene dioxide.

29. The polymerized, cured product obtained by heating the composition of claim 28.

30. A curable composition comprising divinylbenzene dioxide and methylenedianiline in an amount so as to provide from about 0.2 to 5.0 amino hydrogen atoms of said methylenedianiline for each epoxy group of said divinylbenzene dioxide.

31. The polymerized, cured product obtained by heating the composition of claim 30.

32. A curable composition comprising divinylbenzene dioxide and ethylenediamine in an amount so as to provide from about 0.2 to 5.0 amino hydrogen atoms of said ethylenediamine for each epoxy group of said divinylbenzene dioxide.

33. The polymerized, cured product obtained by heating the composition of claim 32.

34. A curable composition comprising divinylbenzene dioxide and the addition product of diethylenetriamine with diglycidyl diether of 2,2-bis(4-hydroxyphenyl)propane in an amount so as to provide from about 0.2 to 5.0 amino hydrogen atoms of said addition product for each epoxy group of said divinylbenzene dioxide.

35. The polymerized, cured product obtained by heating the composition of claim 34.

References Cited in the file of this patent

UNITED STATES PATENTS 2,712,535    Fisch _____ July 5, 1955

OTHER REFERENCES

Everett et al.: Jour. Chem. Soc. (London), 1950, pp. 3131–3135.